United States Patent
Tober et al.

(10) Patent No.: US 10,073,912 B2
(45) Date of Patent: Sep. 11, 2018

(54) COMPUTER SYSTEMS TO MONITOR ONE OR MORE NETWORKED ELECTRONIC RESOURCES FOR ONE OR MORE ADVERSE PERFORMANCE CONDITIONS AND RELATED METHODS THEREFOR

(71) Applicant: Searchmetrics GmbH, Berlin (DE)

(72) Inventors: Marcus Tober, Berlin (DE); Paul Schütte, Berlin (DE); Jens Ulrich, Berlin (DE); Christian Lange, Berlin (DE)

(73) Assignee: SEARCHMETRIC GMBH, Berlin (DE)

( * ) Notice: Subject to any disclaimer, the term of this patent is extended or adjusted under 35 U.S.C. 154(b) by 389 days.

(21) Appl. No.: 14/846,503

(22) Filed: Sep. 4, 2015

(65) Prior Publication Data
US 2017/0068733 A1    Mar. 9, 2017

(51) Int. Cl.
*G06F 17/30* (2006.01)
*H04L 29/08* (2006.01)

(52) U.S. Cl.
CPC ........ *G06F 17/30864* (2013.01); *H04L 67/02* (2013.01)

(58) Field of Classification Search
None
See application file for complete search history.

(56) References Cited

U.S. PATENT DOCUMENTS

| 8,392,890 | B2 * | 3/2013 | Miller ................ G06F 11/3688 714/25 |
| 8,447,751 | B2 | 5/2013 | Stouffer et al. |
| 8,914,348 | B2 | 12/2014 | Gandhi |
| 8,972,379 | B1 | 3/2015 | Grieselhuber et al. |
| 9,020,922 | B2 * | 4/2015 | Yu ..................... G06F 17/30864 707/706 |
| 9,678,928 | B1 * | 6/2017 | Tung .................. G06F 17/2247 |
| 2008/0104113 | A1 * | 5/2008 | Wong ............... G06F 17/30867 |
| 2011/0225142 | A1 | 9/2011 | McDonald |
| 2012/0066211 | A1 | 3/2012 | Gandhi |
| 2012/0158951 | A1 * | 6/2012 | Seifert ................. G06Q 30/02 709/224 |
| 2012/0284252 | A1 * | 11/2012 | Drai ................ G06F 17/30864 707/709 |

(Continued)

FOREIGN PATENT DOCUMENTS

WO    2009065149    5/2009

*Primary Examiner* — Christopher J Raab
(74) *Attorney, Agent, or Firm* — Bryan Cave Leighton Paisner LLP

(57) ABSTRACT

Some embodiments include a system. The system comprises an input device, an output device, one or more processing modules, and one or more non-transitory memory storage modules storing computer instructions. The computer instructions are configured to run on the processing module(s) and perform the acts of: identifying at least one test web page; and analyzing a first test web page of the at least one test web page. The analyzing the first test web page of the at least one test web page comprises crawling the first test web page to detect a first adverse performance condition of the first test web page, and the first adverse performance condition can impact a first search rank assigned to the first test web page when present. Other embodiments of related systems and methods are also provided.

19 Claims, 7 Drawing Sheets

(56) References Cited

U.S. PATENT DOCUMENTS

2013/0282684 A1    10/2013   Stouffer et al.
2013/0282689 A1    10/2013   Stouffer et al.
2013/0282690 A1    10/2013   Stouffer et al.
2013/0282691 A1    10/2013   Stouffer et al.
2016/0125082 A1*   5/2016    Katic ................ G06F 17/30864
                                                                707/710

* cited by examiner

COMPUTER SYSTEMS TO MONITOR ONE OR MORE NETWORKED ELECTRONIC RESOURCES FOR ONE OR MORE ADVERSE PERFORMANCE CONDITIONS AND RELATED METHODS THEREFOR

TECHNICAL FIELD

This disclosure relates generally to systems to monitor one or more electronic resources, and relates more particularly to computer systems to monitor one or more networked electronic resources for one or more adverse performance conditions and related methods.

BACKGROUND

A website can comprise one or more web pages. In some cases, changes made to the web page(s) or other types of circumstances can result in adverse performance condition(s) of the web page(s). These changes and circumstances can impact (e.g., adversely impact) a rank (e.g., a search rank) assigned to one or more of the web page(s) by one or more parties that assign ranks to web pages (e.g., one or more web search engine providers). For example, when multiple parties are involved in maintaining and updating the web page(s) and the efforts of the multiple parties are not synchronized, the efforts of the multiple parties can conflict and result in the adverse performance condition(s) of the web page(s). Meanwhile, the adverse performance condition(s) can result in undesirable consequences for an owner and/or publisher of the website (i.e., the web page(s)), such as, for example, when the impact on the rank assigned to one or more of the web page(s) results in losses in traffic and/or revenue generated by the affected web page(s). Generally, the owner and/or publisher of the website (e.g., web page(s)) may want to be aware of the adverse performance condition(s) and be able to address the adverse performance condition(s) as soon as possible to eliminate or mitigate undesirable consequences resulting from the adverse performance condition(s). Accordingly, there is a need for systems and methods to monitor one or more networked electronic resources (e.g., one or more web page(s)) for one or more adverse performance condition(s).

BRIEF DESCRIPTION OF THE DRAWINGS

To facilitate further description of the embodiments, the following drawings are provided in which.

Figure 1:
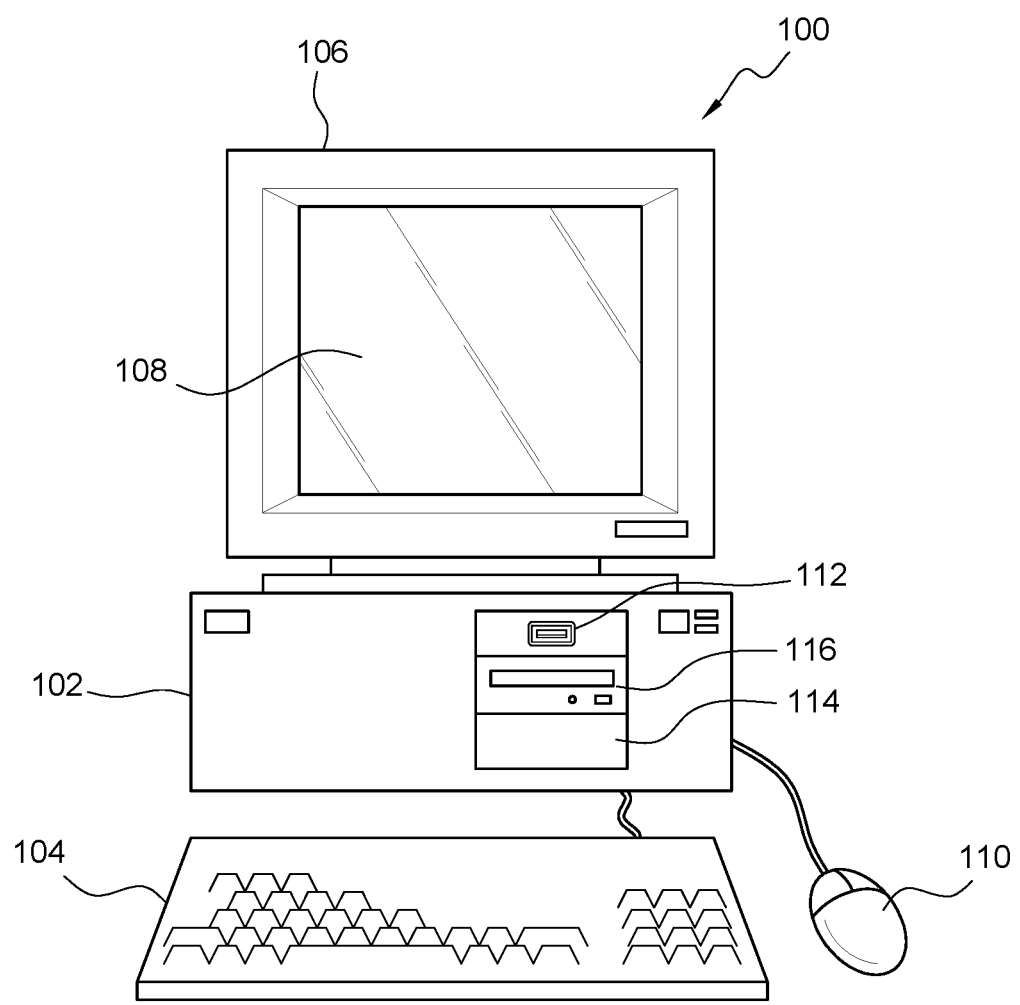
FIG. 1 illustrates a front elevational view of an exemplary computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system comprises an input device, an output device, one or more processing modules, and one or more non-transitory memory storage modules storing computer instructions. The computer instructions are configured to run on the one or more processing modules and perform acts comprising: identifying at least one test web page; and analyzing a first test web page of the at least one test web page. The analyzing the first test web page of the at least one test web page comprises crawling the first test web page to detect a first adverse performance condition of the first test web page, the first adverse performance condition impacting a first search rank assigned to the first test web page when present. The input device and the output device can be configured to permit an operator of the system to manage the one or more processing modules and the one or more non-transitory memory storage modules.

Other embodiments include a method. The method can comprise: executing one or more first computer instructions configured to identify at least one test web page; and executing one or more second computer instructions configured to analyze a first test web page of the at least one test web page. The executing the one or more second computer instructions can comprise executing one or more third computer instructions configured to crawl the first test web page to detect a first adverse performance condition of the first test web page, the first adverse performance condition impacting a first search rank assigned to the first test web page when present. The one or more first computer instructions and the one or more second computer instructions can be configured to run at one or more processing modules and configured to be stored at one or more non-transitory memory storage modules.

Further embodiments include a method. The method can comprise: executing one or more one computer instructions configured to identify a website domain name; executing one or more second computer instructions configured to identify a web search engine; executing one or more third computer instructions configured to identify one or more keywords; executing one or more fourth computer instructions configured to identify multiple domain web pages by determining all web pages associated with the website domain name, the domain web pages consisting of the all web pages associated with the website domain name; executing one or more fifth computer instructions configured to identify multiple significant web pages by determining all domain web pages of the multiple domain web pages that are associated with at least one keyword of the one or more keywords by the web search engine, the multiple significant web pages comprising the all domain web pages of the multiple domain web pages that are associated with the at least one keyword of the one or more keywords by the web search engine; executing one or more sixth computer instructions configured to identify at least one priority web page, the multiple significant web pages comprising the at least one priority web page; executing one or more seventh computer instructions configured to identify at least one test web page, the at least one priority web page comprising the at least one test web page, the at least one test web page comprising multiple test web pages, the multiple test web pages comprising a first test web page and a second test web page, and the executing the one or more sixth computer instructions comprising executing the one or more seventh computer instructions; executing one or more eighth computer instructions configured to identify a first test web page group and a second test web page group, the first test web page group comprising the first test web page, and the second test web page group comprising the second test web page; executing one or more ninth computer instructions configured to analyze the first test web page, the executing the one or more ninth computer instructions comprising executing one or more tenth computer instructions configured to crawl the first test web page to detect a first adverse performance condition of the first test web page, the first adverse performance condition impacting a first search rank assigned to the first test web page when present; executing one or more eleventh computer instructions configured to analyze the second test web page, the executing the one or more eleventh computer instructions comprising executing one or more twelfth computer instructions configured to crawl the second test web page to detect a second adverse performance condition of the second test web page, the second adverse performance condition impacting a second search rank assigned to the second test web page when present; after executing the one or more ninth computer instructions and after executing the one or more eleventh computer instructions, executing one or more thirteenth computer instructions configured to analyze the first test web page, the executing the one or more thirteenth computer instructions comprising executing one or more fourteenth computer instructions configured to crawl the first test web page to detect the first adverse performance condition of the first test web page, the first adverse performance condition impacting the first search rank assigned to the first test web page when present; and executing one or more fifteenth computer instructions configured to display a graphical user interface showing the first adverse performance condition of the first test web page. In these embodiments, executing the one or more ninth computer instructions and executing the one or more eleventh computer instructions can occur during a first cycle, and executing the one or more ninth computer instructions and executing the one or more eleventh computer instructions can occur at different times within the first cycle. Meanwhile, executing the one or more thirteenth computer instructions can occur during a second cycle following the first cycle. Further, the one or more first computer instructions, the one or more second computer instructions, the one or more third computer instructions, the one or more fourth computer instructions, the one or more fifth computer instructions, the one or more sixth computer instructions, the one or more seventh computer instructions, the one or more eighth computer instructions, the one or more ninth computer instructions, the one or more eleventh computer instructions, the one or more thirteenth computer instructions, and the one or more fifteenth computer instructions can be configured to run at one or more processing modules and configured to be stored at one or more non-transitory memory storage modules.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. System 100 is suitable to implement at least part of a central computer system, at least part of one or more user computer systems, and/or at least part of one or more third party computer systems of the system of FIG. 3, and/or to implement at least part of one or more of the activities of the method of FIG. 6 or one or more other methods and computer systems described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a refreshing monitor 106, a keyboard 104, and/or a mouse 110, etc.) can also be appropriate for implementing part or all of one or more embodiments of the techniques, methods, and/or systems described herein.

Figure 2:
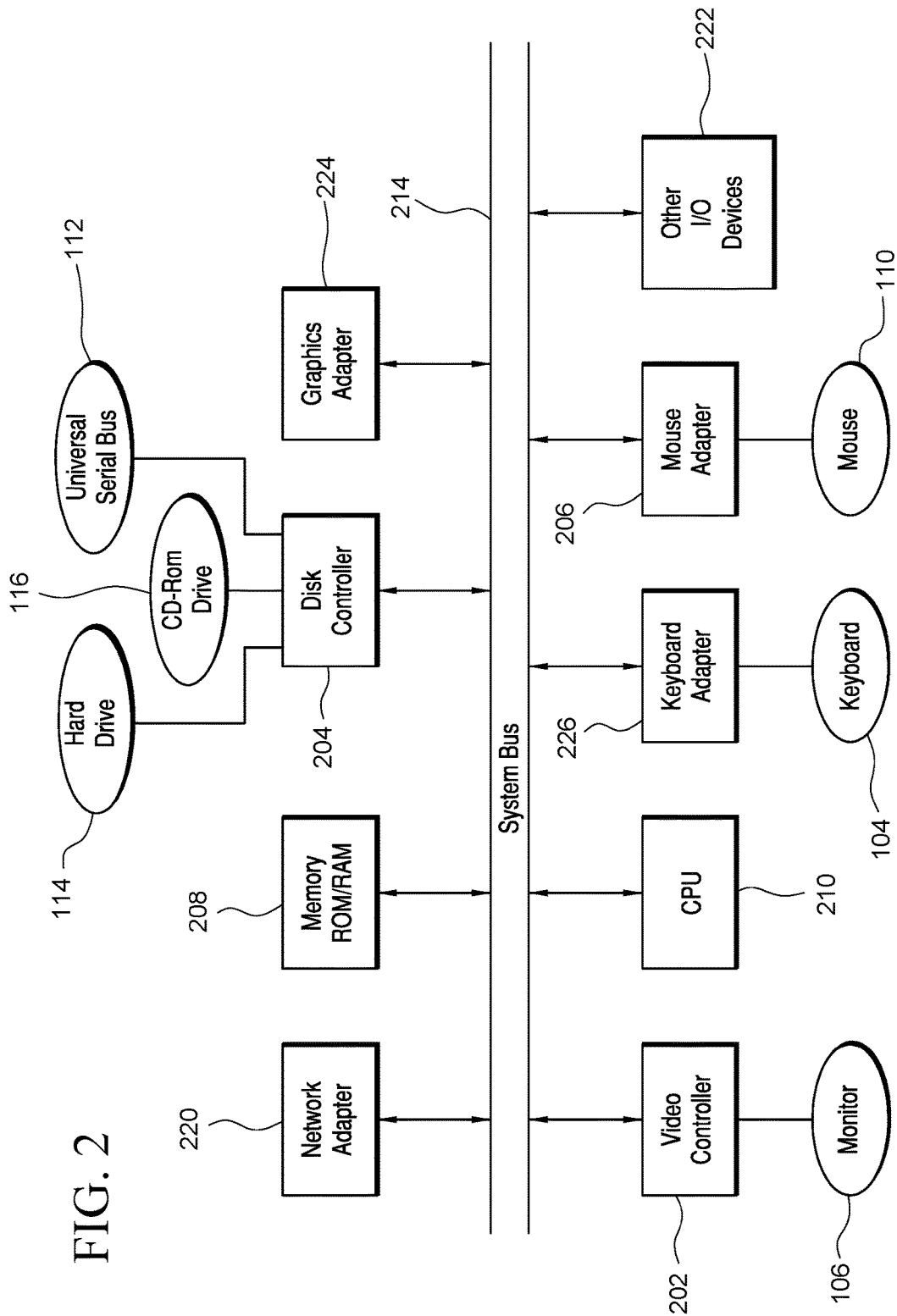
FIG. 2 illustrates a representative block diagram of exemplary elements included on the circuit boards inside a chassis of the computer system of FIG. 1.

Computer system 100 can comprise chassis 102 containing one or more circuit boards (not shown), a Universal Serial Bus (USB) port 112, a Compact Disc Read-Only Memory (CD-ROM), Digital Video Disc (DVD) drive, and/or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) or Unified Extensible Firmware Interface (UEFI) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States of America, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1 & 2) and mouse 110 (FIGS. 1 & 2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1 & 2) to display images on a screen 108 (FIG. 1) of computer system 100 (FIG. 1). Disk controller 204 can control hard drive 114 (FIGS. 1 & 2), USB port 112 (FIGS. 1 & 2), and CD-ROM drive 116 (FIGS. 1 & 2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein. In various embodiments, computer 100 can be reprogrammed with one or more modules, applications, and/or databases to convert computer system 100 from a general purpose computer to a special purpose computer.

Further, although computer system 100 is illustrated as a desktop computer in FIG. 1, in many examples, system 100 can have a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
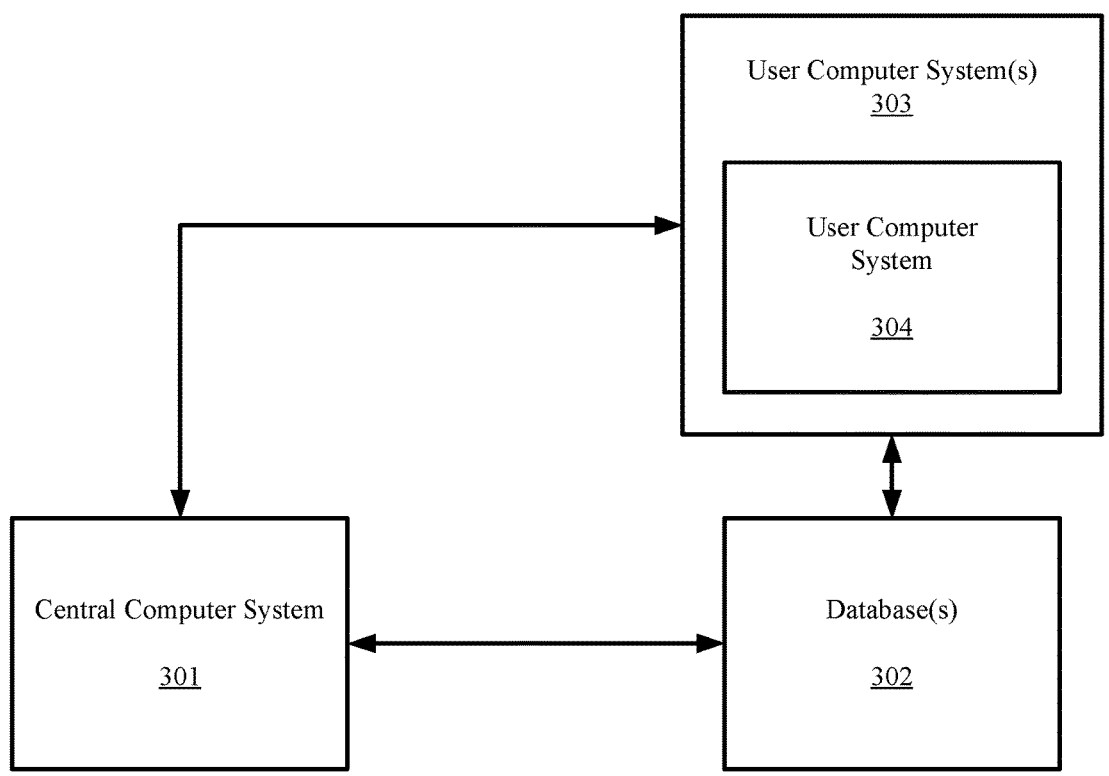
FIG. 3 illustrates a representative block diagram of a system, according to an embodiment.
Figure 6:
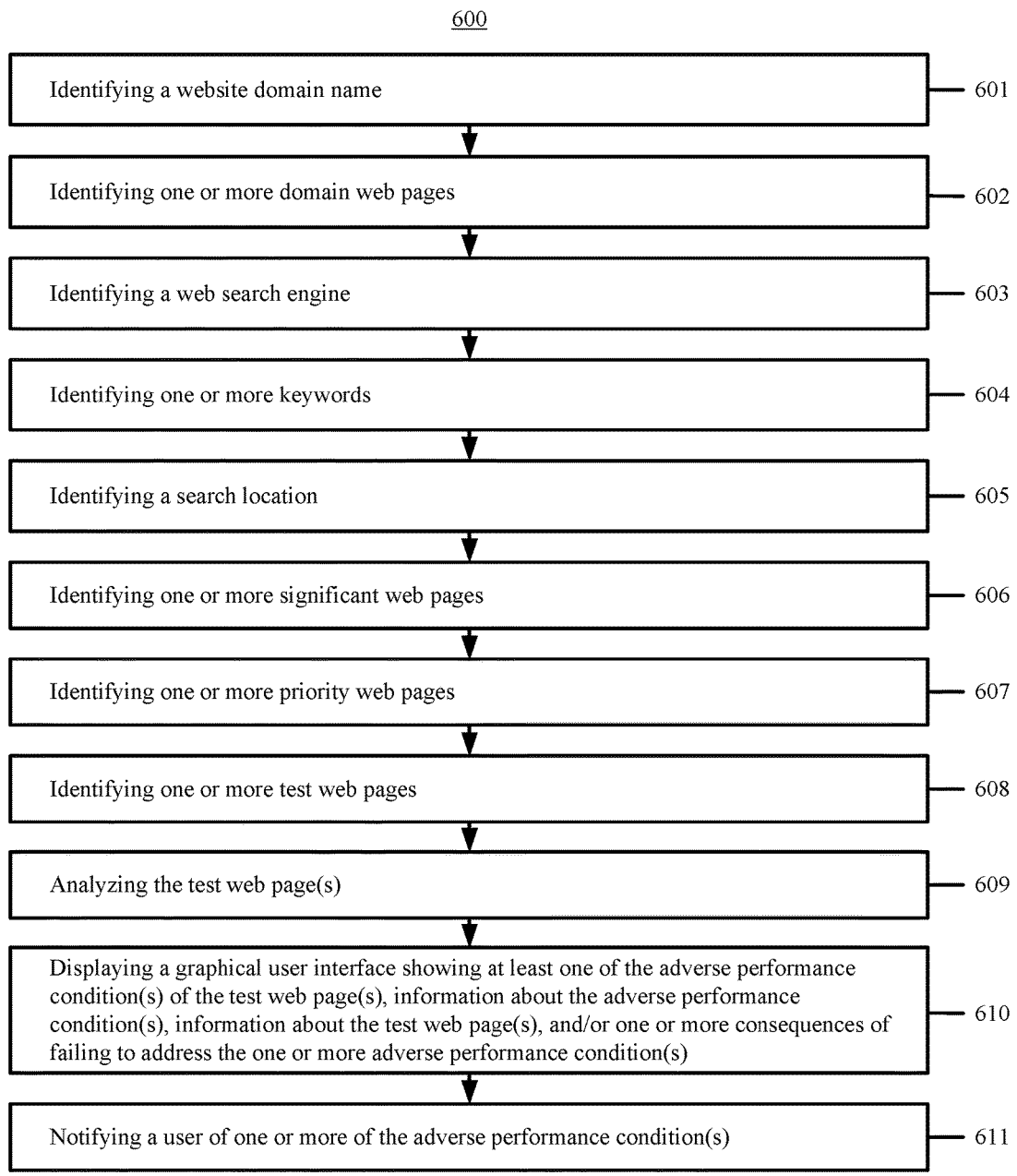
FIG. 6 illustrates a flow chart for a method, according to an embodiment.

Skipping ahead now in the drawings, FIG. 3 illustrates a representative block diagram of a system 300, according to an embodiment. In many embodiments, system 300 can comprise a computer system. In some embodiments, system 300 can be implemented to perform part or all of a method. The method can be similar or identical to method 600 (FIG. 6).

System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As explained in greater detail below, in many embodiments, system 300 can be operable to monitor one or more networked electronic resources (e.g., one or more web pages) for one or more adverse performance conditions. In these or other embodiments, system 300 can notify a user and/or one or more third parties when one or more adverse performance conditions are detected, and in some embodiments, can provide to the user and/or the third parties the adverse performance condition(s), information about the adverse performance condition(s), information about the test web page(s) having the adverse performance condition(s), and/or consequences of failing to address the adverse performance condition(s). System 300 can provide such information and/or consequences to the user and/or the third parties through notifications (e.g., direct mail, electronic mail, text messaging, video messaging, voice messaging, etc.) and/or through a graphical user interface generated by system 300 (FIG. 3). Accordingly, in many examples, the user and/or one or more third parties can be permitted to remedy one or more of the adverse performance condition(s) before the adverse performance condition(s) results in potentially significant undesirable consequences for the owner and/or publisher of the web page(s).

Generally, therefore, system 300 can be implemented with hardware and/or software, as described herein. In some embodiments, at least part of the hardware and/or software can be conventional, while in these or other embodiments, part or all of the hardware and/or software can be customized (e.g., optimized) for implementing part or all of the functionality of system 300 described herein.

Specifically, system 300 can comprise a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more output devices (e.g., one or more monitors, one or more touch screen displays, one or more speakers, etc.). Accordingly, the input device(s) can comprise one or more devices configured to receive one or more inputs and/or the output device(s) can comprise one or more devices configured to provide (e.g., present, display, emit, etc.) one or more outputs. For example, in these or other embodiments, one or more of the input device(s) can be similar or identical to keyboard 104 (FIG. 1) and/or a mouse 110 (FIG. 1). Further, one or more of the output device(s) can be similar or identical to refreshing monitor 106 (FIG. 1) and/or screen 108 (FIG. 1). The input device(s) and the output device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the output device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more user computer systems 303 (e.g., a user computer system 304) of one or more users of system 300. For example, the user(s) can interface (e.g., interact) with central computer system 301, and vice versa, via user computer system(s) 303. In some embodiments, system 300 can comprise user computer system(s) 303.

In many embodiments, central computer system 301 can refer to a back end of system 300 operated by an operator and/or administrator of system 300. In these or other embodiments, the operator and/or administrator of system 300 can manage central computer system 301, the processing module(s) of central computer system 301, and/or the memory storage module(s) of central computer system 301 using the input device(s) and/or output device(s) of central computer system 301.

Like central computer system 301, user computer system(s) 303 each can be similar or identical to computer system 100 (FIG. 1), and in many embodiments, each of user computer system(s) 303 can be similar or identical to each other. In many embodiments, user computer system(s) 303 can comprise one or more desktop computer devices, one or more wearable user computer devices, and/or one or more mobile devices, etc. At least part of central computer system 301 can be located remotely from user computer system(s) 303.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™, and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 and/or user computer system(s) 303 (e.g., user computer system 304) can be configured to communicate with one or more third-party computer systems (i.e., other than central computer system 301 and/or user computer system(s) 303). In some embodiments, system 300 can comprise the third-party computer system(s). However, the third-party computer systems are not shown at FIG. 3 in order to simplify the illustration of FIG. 3.

Like central computer system 301 and user computer system(s) 303, the third-party computer system(s) each can be similar or identical to computer system 100 (FIG. 1), and in many embodiments, each of the third-party computer system(s) can be similar or identical to each other. In many embodiments, the third-party computer system(s) can comprise a single computer or server, or a cluster or collection of computers or servers, or a cloud of computers or servers, etc. At least part of central computer system 301 and/or user computer system(s) 303 can be located remotely from user computer system(s) 303.

Meanwhile, in many embodiments, for reasons explained later herein, central computer system 301 also can be configured to communicate with one or more databases 302 (e.g., one or more web page databases 512 (FIG. 5), one or more condition history databases 513 (FIG. 5), one or more reference databases 514 (FIG. 5), etc.). Database(s) 302 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 302, that particular database can be stored on a single memory storage module of the memory storage module(s) and/or the non-transitory memory storage module (s) storing database(s) 302 or it can be spread across multiple of the memory storage module(s) and/or non-transitory memory storage module(s) storing database(s) 302, depending on the size of the particular database and/or the storage capacity of the memory storage module(s) and/or non-transitory memory storage module(s).

In these or other embodiments, the memory storage module(s) of central computer system 301 can comprise some or all of the memory storage module(s) storing database(s) 302. In further embodiments, some of the memory storage module(s) storing database(s) 302 can be part of one or more of user computer system(s) 303 and/or one or more of the third-party computer systems, and in still further embodiments, all of the memory storage module(s) storing database(s) 302 can be part of one or more of user computer system(s) 303 and/or one or more of the third-party computer system(s). Notably, database(s) 302 are illustrated at FIG. 3 apart from central computer system 301 and user computer system(s) 303 to better illustrate that database(s) 302 can be stored at memory storage module(s) of central computer system 301, user computer system(s) 303, and/or one or more of the third-party computer system(s), depending on the manner in which system 300 is implemented.

Database(s) 302 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database and IBM DB2 Database.

Meanwhile, communication between central computer system 301, user computer system(s) 303, the third-party computer system(s), and/or database(s) 302 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.

For convenience, the functionality of system 300 is described generally herein as it relates particularly to user computer system 304 and a single user, but in many embodiments, the functionality of system 300 can be extended to multiple (e.g., all) of user computer system(s) 303 and multiple users, at the same or at different times.

Also for convenience, the functionality of system 300 is described generally herein as it relates to one or more networked electronic resources comprising one or more web pages, but in many embodiments, the functionality of system 300 can be extended to be implemented with any suitable networked electronic resource(s). Networked electronic resource(s) can refer to one or more electronic resources (e.g., electronic documents) associated with or comprising (i) at least one electronic reference (e.g., uniform resource identifier (URI)) accessing or providing access to the electronic resource(s) and/or (ii) at least one electronic reference (e.g., uniform resource identifier (URI)) accessing or providing access to one or more other electronic resource(s) (e.g., other electronic document(s)).

Figure 4:
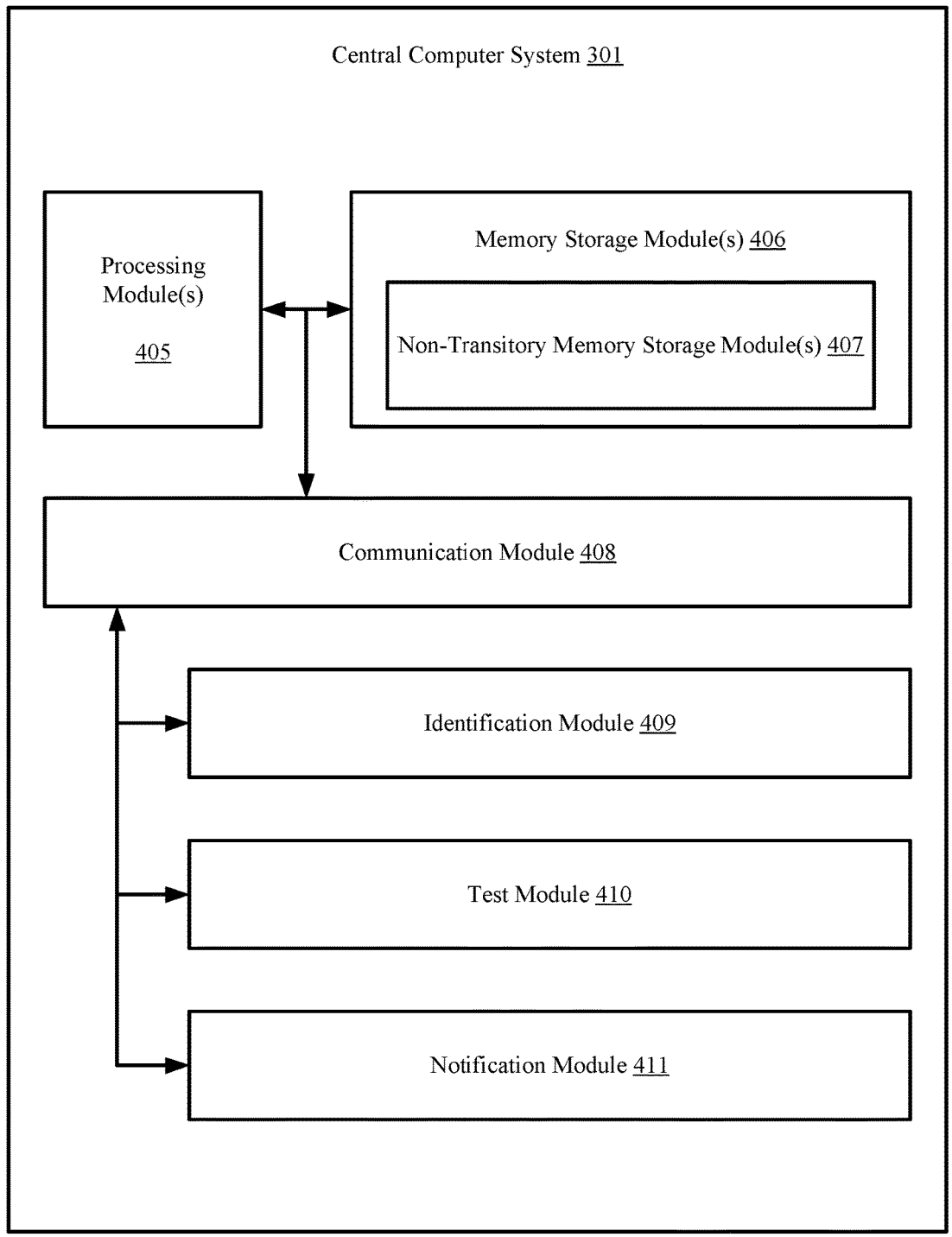
FIG. 4 illustrates a representative block diagram of a central computer system of the system of FIG. 3, according to the embodiment of FIG. 3.
Figure 5:
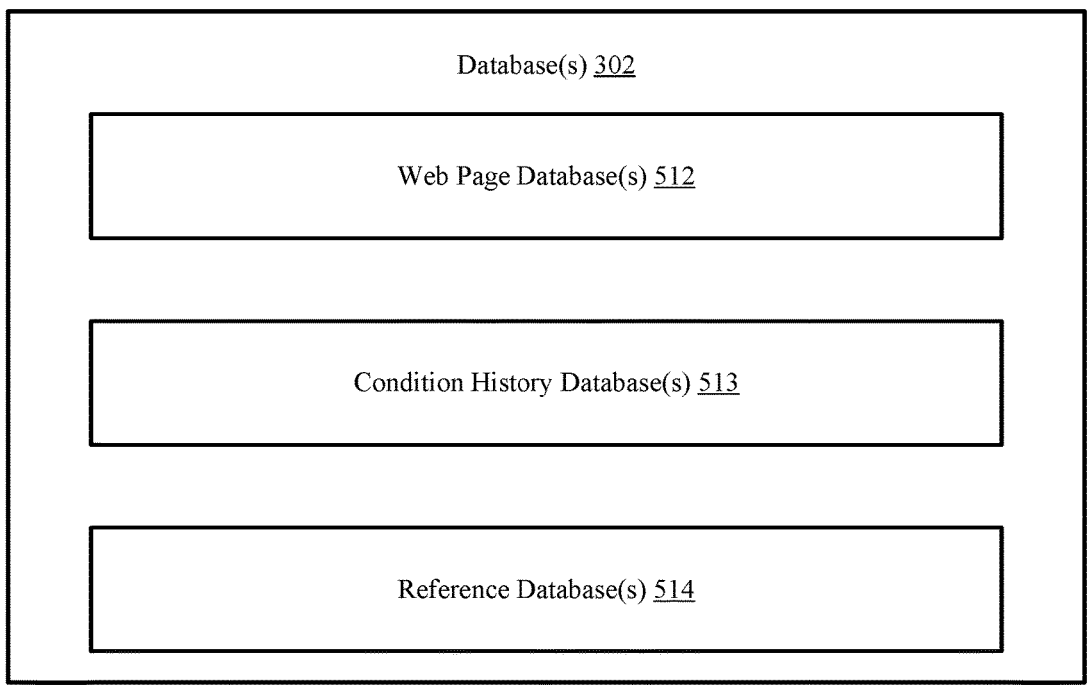
FIG. 5 illustrates a representative block diagram of one or more databases of the system of FIG. 3, according to the embodiment of FIG. 3.

Turning ahead now in the drawings, FIG. 4 illustrates a representative block diagram of central computer system 301, according to the embodiment of FIG. 3; and FIG. 5 illustrates a representative block diagram of database(s) 302, according to the embodiment of FIG. 3.

Referring first to FIG. 4, in many embodiments, central computer system 301 can comprise one or more processing modules 405 and one or more memory storage modules 406. Further, memory storage module(s) 406 can comprise one or more non-transitory memory storage modules 407.

Meanwhile, in these or other embodiments, central computer system 301 comprises a communication module 408, an identification module 409, and a test module 410. Further, in some embodiments, central computer system 301 can comprise a notification module 411. In these or other embodiments, part or all of at least one or more of communication module 408, identification module 409, test module 410, and/or notification module 411 can be part of at least one or more others of communication module 408, identification module 409, test module 410, and/or notification module 411, and vice versa. In some embodiments, notification module 411 can be omitted.

Referring briefly to FIG. 5, as explained in greater detail below, database(s) 302 can comprise one or more constituent databases. For example, in many embodiments, database(s) 302 can comprise web page database(s) 512. In some embodiments, database(s) 302 can comprise condition history database(s) 513 and/or reference database(s) 514. In some embodiments, part or all of at least one of the constituent database(s) of database(s) 302 (e.g., web page database(s) 512, condition history database(s) 513, reference database(s) 514, etc.) can be part of at least one other of the constituent database(s) of database(s) 302 In further embodiments, condition history database(s) 513 and/or reference database(s) 514 can be omitted.

Returning now back to FIG. 4, in many embodiments, processing module(s) 405 can be similar or identical to the processing module(s) described above with respect to computer system 100 (FIG. 1) and/or central computer system 301 (FIG. 3); memory storage module(s) 406 can be similar or identical to the memory storage module(s) described above with respect to computer system 100 (FIG. 1) and/or central computer system 301 (FIG. 3); and/or non-transitory memory storage module(s) 407 can be similar or identical to the non-transitory memory storage module(s) described above with respect to computer system 100 (FIG. 1) and/or central computer system 301 (FIG. 3). Further, communication module 408, identification module 409, test module 410, and notification module 411 can be implemented with hardware and/or software, as desirable. Although communication module 408, identification module 409, test module 410, and notification module 411 are shown at FIG. 4 as being separate from processing module(s) 405, memory storage module(s) 406, and/or non-transitory memory storage module(s) 407, in many embodiments, part or all of communication module 408, identification module 409, test module 410, and notification module 411 can be stored at memory storage module(s) 406 and/or non-transitory memory storage module(s) 407 and can be called and run at processing module(s) 405, such as, for example, when the part or all of communication module 408, identification module 409, test module 410, and notification module 411 are implemented as software.

Communication Module 408

Communication module 408 is operable to provide and manage communication between the various elements of central computer system 301 (e.g., processing module(s) 405, memory storage module(s) 406, non-transitory memory storage module(s) 407, communication module 408, identification module 409, test module 410, notification module 411, etc.) and manage incoming and outgoing communications between central computer system 301 (FIG. 3) and user computer system(s) 303 of FIG. 3 (e.g., user computer system 304 (FIG. 3)), the third party computer system(s), and/or database(s) 302 (FIG. 3). Like the communications between central computer system 301 (FIG. 3), user computer system(s) 303 (FIG. 3), the third party computer system(s), and/or database(s) 302 (FIG. 3), communication module 408 can be implemented using any suitable manner of wired and/or wireless communication, and/or using any one or any combination of wired and/or wireless communication network topologies and/or protocols, as described above with respect to the central computer system 301 (FIG. 3), user computer system(s) 303 (FIG. 3), the third party computer system(s), and/or database(s) 302 (FIG. 3). In many embodiments, communication module 408 can be part of hardware and/or software implemented for communications between central computer system 301 (FIG. 3), user computer system(s) 303 (FIG. 3), the third party computer system(s), and/or database(s) 302 (FIG. 3). For example, as applicable, communication module 408 can permit processing module(s) 405 to call (i) software (e.g., at least part of identification module 409, test module 410, and/or notification module 411, etc.) stored at memory storage module(s) 406 and/or non-transitory memory storage module(s) 407, and/or (ii) data stored at memory storage module(s) 406, at non-transitory memory storage module(s) 407, and/or in database(s) 302 (FIG. 3).

Identification Module 409

Identification module 409 is operable to identify one or more (e.g., multiple) domain web pages. In these or other embodiments, identification module 409 can be operable to identify a website domain name. For example, the website domain name can be associated with a website of a user of system 300 (FIG. 3), and the website can comprise the domain web page(s). In many embodiments, the user can provide the website domain name to identification module 409. For example, in these embodiments, identification module 409 can receive the website domain name from the user (e.g., from user computer system 304 of the user) via communication module 408, as described above.

Further, identification module 409 can identify the domain web page(s) by determining one or more (e.g., multiple, all) web pages associated with the website domain name identified by identification module 409. In some embodiments, the domain web page(s) can comprise or consist of the one or more (e.g., multiple, all) web pages associated with the website domain name.

In some embodiments, the user can provide the one or more (e.g., multiple, all) web pages associated with the website domain name to identification module 409. For example, in these embodiments, identification module 409 can receive the one or more (e.g., multiple, all) web pages associated with the website domain name from the user (e.g., from user computer system 304 of the user) via communication module 408, as described above.

In other embodiments, identification module 409 can crawl the one or more (e.g., multiple, all) web pages associated with the website domain name in order to determine the one or more (e.g., multiple, all) web pages associated with the website domain name identified by identification module 409 and to identify the domain web page(s) as the one or more (e.g., multiple, all) web pages associated with the website domain name. In some embodiments, identification module 409 can crawl the one or more (e.g., multiple, all) web pages associated with the website domain name after the website domain name is identified. In other embodiments, identification module 409 can crawl the one or more (e.g., multiple, all) web pages associated with the website domain name prior to having identified the website domain name and can store those web page(s) at web page database(s) 512 for reference when the website domain name is later identified by identification module 409. An advantage of identification module 409 crawling the one or more (e.g., multiple, all) web pages associated with the website domain name after the website domain name is identified may be reducing an amount of data needed to be stored to implement system 300 (FIG. 3). However, identification module 409 crawling the one or more (e.g., multiple, all) web pages associated with the website domain name after the website domain name is identified can increase latency of system 300 (FIG. 3) because identification module 409 can require time to do the crawling. Meanwhile, identification module 409 crawling the one or more (e.g., multiple, all) web pages associated with the website domain name prior to identification module 409 identifying the website domain name can increase data storage requirements while decreasing latency of system 300 (FIG. 3).

In further embodiments, identification module 409 can crawl one or more search result web pages of one or more web search engines in order to determine the one or more (e.g., multiple, all) web pages associated with the website domain name identified by identification module 409 and to identify the domain web page(s) as the one or more (e.g., multiple, all) web pages associated with the website domain name. In some embodiments, identification module 409 can crawl the search result web page(s) of the web search engine(s) in order to determine the one or more (e.g., multiple, all) web pages associated with the website domain name after the website domain name is identified. In other embodiments, identification module 409 can crawl the search result web page(s) of the web search engine(s) in order to determine the one or more (e.g., multiple, all) web pages associated with the website domain name prior to having identified the website domain name and can store those web page(s) at web page database(s) 512 for reference when the website domain name is later identified by identification module 409. An advantage of identification module 409 crawling the search result web page(s) of the web search engine(s) after the website domain name is identified may be reducing an amount of data needed to be stored to implement system 300 (FIG. 3). However, identification module 409 crawling the search result web page(s) of the web search engine(s) after the website domain name is identified can increase latency of system 300 (FIG. 3) because identification module 409 can require time to do the crawling. Meanwhile, identification module 409 crawling the search result web page(s) of the web search engine(s) prior to identification module 409 identifying the website domain name can increase data storage requirements while decreasing latency of system 300 (FIG. 3).

In further embodiments, identification module 409 can crawl some of or all sub-pages and/or parent pages of the web pages provided by the user. Various combinations of a partial user identification process and a partial crawling process also can be used together.

In some embodiments, when the domain web page(s) comprise or consist of multiple domain web pages, identification module 409 can be operable to identify one or more (e.g., multiple) significant web pages of the multiple domain web pages. In some of these embodiments or in other embodiments, identification module 409 can be operable to identify a web search engine and one or more keywords, and in further embodiments, a search location.

In many embodiments, the user can provide the web search engine to identification module 409. For example, in these embodiments, identification module 409 can receive the web search engine from the user (e.g., from user computer system 304 of the user) via communication module 408, as described above. In further, embodiments, the web search engine can comprise any suitable web search engine configured to search websites and/or web pages. Exemplary web search engines can comprise (i) the Google Search web search engine by Google Inc. of Mountain View, Calif., United States of America, (ii) the Yahoo Search web search engine by Yahoo Inc. of Sunnyvale, Calif., United States of America, (iii) the Bing web search engine by Microsoft Corp. of Redmond, Wash., United States of America, etc.

In many embodiments, the user can provide one or more of the keyword(s). The keyword(s) provided by the user can be referred to as user keyword(s). For example, in these embodiments, identification module 409 can receive the user keyword(s) from the user (e.g., from user computer system 304 of the user) via communication module 408, as described above. Meanwhile, in these or other embodiments, identification module 409 can receive one or more of the keyword(s) by referencing one or more of reference database(s) 514 (FIG. 5). For example, in these embodiments, reference database(s) 514 (FIG. 5) can comprise one or more keyword databases. The keyword database(s) can comprise one or more keyword index(es) of one or more keywords referred to as common keyword(s).

In these embodiments, keyword(s) can be one or more words that are associated with a web page by a web search engine. That is, a web search engine can be configured to provide (e.g., aggregate and/or list) the web page(s) associated with particular keyword(s) when the particular keyword (s) are provided to the web search engine(s) as part of a search query. Meanwhile, the web search engine can assign certain value(s) to keyword(s) and charge publishers of the associated web page(s) a fee in exchange for having their web page(s) associated with the keyword(s). In these or other examples, the fee charged for association with a keyword can differ depending on the particular keyword because one keyword may command more interest to users of a web search engine (i.e., more web traffic) than another. Accordingly, for this reason and/or for other reasons, one keyword may be considered more important than another. Therefore, the user keyword(s) can be one or more keywords that the user has deemed to be important according to the user, and the common keyword(s) can be one or more keywords that the operator or administration of system 300 (FIG. 3) has deemed to be important generally (e.g., to an average user).

In many embodiments, the user can provide the search location to identification module 409. For example, in these embodiments, identification module 409 can receive the web search engine from the user (e.g., from user computer system 304 of the user) via communication module 408, as described above. In other embodiments, identification module 409 can automatically determine the search location based on detecting an internet protocol address of the user when the user provides the web search engine and/or the keyword(s) to identification module 409. The search location can comprise any suitable defined region (e.g., country).

In many embodiments, identification module 409 can identify the significant web page(s) by determining one or more (e.g., multiple, all) domain web pages associated with one or more keywords of the keyword(s) identified by identification module 409 by the web search engine identified by identification module 409. In these or other embodiments, when the significant web page(s) comprises multiple significant web pages, two or more of the significant web pages can be associated with the same keywords of the keyword(s) identified by identification module 409, and/or two or more of the significant web pages can be associated with at least one different keyword of the keyword(s) identified by identification module 409. Regardless of the manner of keyword(s) with which the significant web page (s) are associated, the significant web page(s) can comprise or consist of the one or more (e.g., multiple, all) domain web pages associated with one or more keywords of the keyword (s) identified by identification module 409 by the web search engine identified by identification module 409.

Meanwhile, in other embodiments, identification module 409 can identify the significant web page(s) in any suitable manner whereby one or more of the multiple domain web pages can be distinguished from one or more other of the multiple domain web pages. For example, in some embodiments, the user can provide the significant web page(s) to identification module 409. For example, in these embodiments, identification module 409 can receive the significant web page(s) from the user (e.g., from user computer system 304 of the user) via communication module 408, as described above.

In some embodiments, when the significant web page(s) comprise or consist of multiple significant web pages, identification module 409 can be operable to identify one or more priority web pages of the multiple significant web pages of the multiple domain web pages. In these embodiments, identification module 409 can distinguish the priority web page(s) from the other of the multiple significant web pages as being of higher priority or importance.

In many embodiments, identification module 409 can determine a priority score for each significant web page of the multiple significant web pages. In these embodiments, identification module 409 can implement any suitable manner of scoring the multiple significant web pages.

For example, in many embodiments, the priority score of a significant web page of the multiple significant web pages can be determined based on a value of the keyword(s) associated with that significant web page by the web search engine identified by identification module 409. Although a value of the keyword(s) associated with a particular significant web page can be determined in any suitable manner, in many embodiments, the value of the keyword(s) can be determined by using a keyword estimated traffic index and a keyword cost per click index.

In these embodiments, identification module 409 can communicate with reference database(s) 514 (FIG. 5) via communication module 408 to determine a rank assigned to the particular significant web page by the web search engine identified by identification module 409 for a particular keyword and a search volume for the particular keyword. For example, in these embodiments, reference database(s) 514 (FIG. 5) can comprise one or more traffic databases. The traffic database(s) can comprise one or more keyword estimated traffic index(es). Meanwhile, for the rank and search volume determined, identification module 409 can determine an estimated amount of traffic for that particular keyword (i.e., a keyword estimated traffic index). In other words, the keyword estimated traffic index can refer to an estimated number of times the users of the web search engine will view the web page over a predetermined interval of time (e.g., per month) based on the rank of the web page and the search volume of the associated keyword. Meanwhile, identification module 409 can communicate with reference database(s) 514 (FIG. 5) via communication module 408 to determine the cost per click (CPC) for advertisements associated with the particular keyword based on the search volume of the associated keyword (i.e., the keyword cost per click index). For example, in these embodiments, reference database(s) 514 (FIG. 5) can comprise one or more cost databases. The cost database(s) can comprise one or more keyword cost per click index(es). The value of the particular keyword associated with the significant web page can then be determined by multiplying the keyword cost per click index by the keyword estimate traffic index. Accordingly, the priority score of the particular significant web page can correspond to the calculated value of the keyword(s) associated with that particular significant web page. When the particular significant web page is associated with multiple keywords, the value of the keywords can be summed up to provide the aggregate value of the keywords associated with the particular significant web page.

In other embodiments, the value of the keyword(s) can be calculated using a keyword cost per impression (CPI) or a keyword cost per thousand impressions (CPM) index. In further embodiments, the value of keyword(s) can be calculated based only on the keyword traffic index without regard for the keyword CPC, CPI, or CPM index(es). In still further embodiments, the priority score can be determined based on traffic and/or conversions for the significant web page without regard for keyword(s) associated with the particular significant web page. In some of these embodiments, identification module 409 can identify the multiple significant web pages without regard for keyword(s) generally. Meanwhile, in various embodiments, identification module 409 can use a combination of these or other approaches to determine the priority scores of the multiple significant web pages.

In further embodiments, the priority score of a significant web page of the multiple significant web pages can be determined based on one or more social signals of one or more social networks corresponding to the significant web page of the multiple significant web pages. For example, in these embodiments, the priority score of a significant web page of the multiple significant web pages can be determined based on a number of times the significant web page is shared on one or more social networks, such as, for example, the Facebook social network of Facebook, Inc. of Menlo Park, Calif., United States of America, and/or the Twitter social network of Twitter, Inc. of San Francisco, Calif., United States of America.

In these or other embodiments, the priority score of a significant web page of the multiple significant web pages can be determined based on a backlink profile of the significant web page of the multiple significant web pages. A backlink profile can refer to a quantity of web pages linking to a web page.

In these or other embodiments, the priority score of a significant web page of the multiple significant web pages can be determined based on a type of web template used to implement (e.g., form) the significant web page of the multiple significant web pages. Exemplary web templates can comprise a category web page web template, which can be used to implement (e.g., form) a category-type web page, a product web page web template, which can be used to implement (e.g., form) a product-type web page, etc.

Meanwhile, after identification module 409 determines a priority score for each significant web page of the multiple significant web pages, identification module 409 can determine the priority web page(s) from the multiple significant web pages based on the priority scores of the multiple significant web pages. In some embodiments, identification module 409 can identify the priority web page(s) as any of the significant web page(s) comprising a priority score over a threshold value. In other embodiments, identification module 409 can identify the priority web page(s) as a predetermined number of the significant web page(s) or a predetermined percentage of the significant web page(s) comprising a highest priority score relative to each other. In further embodiments, identification module 409 can identify the priority web page(s) according to a relationship between two or more of the significant web page(s) relative to each other. For example, identification module 409 can identify a largest difference in score between two of the significant web page(s) and identify the priority web page(s) as the higher scored significant web page of the two and any significant web page(s) scoring higher. In general, any suitable manner of distinguishing the multiple significant web pages using the priority scores can be implemented to identify the priority web page(s).

In some embodiments, the user can select how identification module 409 determines identifies the priority web page(s) in view of the priority scores of the significant web page(s). In these or other embodiments, identification module 409 can receive the selection from the user (e.g., from user computer device 304 (FIG. 3) of the user) via communication module 408, as described above. For example, in various embodiments, the user can select to have identification module 409 identify a predetermined number of the significant web page(s) having a highest priority score as the test web page(s) and can select the predetermined number of significant web page(s) to identify as test web page(s).

In further embodiments, the user can provide one or more of the significant web page(s) and/or the priority web page(s) to identification module 409 for identification by identification module 409 as part or all of the significant web page(s) and/or the priority web page(s). In still further embodiments, identification module 409 can receive one or more of the significant web page(s) and/or the priority web page(s) from one or more third parties for identification as part or all of the significant web page(s) and/or the priority web page(s). Identification module 409 can communicate with the user (e.g., user computer system 304 of the user) and/or the one or more third parties (e.g., one or more third party computer systems of the one or more third parties) via communication module 408, as described above.

In these or other embodiments, identification module 409 can identify one or more of the significant web page(s) and/or the priority web page(s) based on a type of web template used to implement (e.g., form) the significant web page(s) and/or the priority web page(s) irrespective of a priority score of the relevant web page(s).

In many embodiments, identification module 409 can communicate with web page database(s) 512 (FIG. 5) via communication module 408 to store one or more electronic references (e.g., uniform resource identifiers) corresponding to the domain web page(s), the significant web page(s), and/or the priority web page(s). Further, in many embodiments, identification module 409 can update identifying and storing the domain web page(s), the significant web page(s), and/or the priority web page(s). In some embodiments, identification module 409 can update identifying and storing the domain web page(s), the significant web page(s), and/or the priority web page(s) upon identification module 409 receiving an update request from the user. In these or other embodiments, identification module 409 can update identifying and storing the domain web page(s), the significant web page(s), and/or the priority web page(s) at a regular predetermined interval (e.g., daily, weekly, monthly, yearly, etc.).

In these embodiments, test module 410 can receive the electronic references directly from identification module 409. In other embodiments, test module 410 can reference web page database(s) 512 to obtain the electronic references in order to perform its functionality. In other embodiments, Regardless of the manner in which test module 410 receives the electronic references, having introduced the domain web page(s), the significant web page(s), and the priority web page(s) and the manner in which each is identified by identification module 409, each is now discussed further in context with test module 410 below.

Test Module 410

Test module 410 is operable to analyze at least one test web page, such as, for example, to detect one or more adverse performance conditions of the test web page(s). Accordingly, test module 410 is further operable to identify the test web page(s).

In various embodiments, adverse performance condition(s) of a web page (i.e., a test web page) can comprise one or more general adverse performance condition(s) and/or one or more fatal adverse performance condition(s). In these or other embodiments, general adverse performance condition(s) can refer to any condition of a web page that, when present, can impact (e.g., adversely impact) a search rank assigned to the web page (and/or one or more related web pages) by one or more web search engines (e.g., the web search engine identified by identification module 409). Meanwhile, fatal adverse performance condition(s) can refer to any condition of a web page that, when present, can fatally impact (e.g., adversely impact) the search rank assigned to the web page (and/or one or more related web pages) by one or more web search engines (e.g., the web search engine identified by identification module 409). A fatal impact can be distinguished from an impact generally in that a fatal impact can refer to an impact that can cause a substantial change in rank and/or can cause the web page to be altogether delisted by one or more of the web search engine(s), while a general impact can refer to an impact that can cause any change in the rank of the web page by one or more of the web search engine(s). For example, substantial changes in rank can refer to changes in rank sufficiently great to have a comparable result (e.g., loss in traffic, loss in revenue, etc.) to the test web page being altogether delisted by one or more of the web search engine(s). Accordingly, general adverse performance condition(s) can comprise fatal adverse condition(s). In many embodiments, test module 410 can apply greater weight to adverse performance condition(s) relative to the web search engine identified by identification module 409 than relative to other web search engine(s), when applicable.

Exemplary fatal adverse performance conditions can comprise: (i) a server redirect other than a permanent redirect (e.g., a temporary redirect (Status Code 302)), (ii) a 4XX server error (e.g., a web page cannot be found (Status Code 404)), (iii) a 5XX server error (e.g., internal server error (Status Code 500)), (iv) a permanent redirect (Status Code 301), (v) a meta tag no index, (vi) a hypertext transfer protocol (HTTP) tag no index, (v) a meta canonical to other web page, (vi) an HTTP canonical to other web page, (vii) a redirect chain (e.g., more than five redirects in a row), (viii) a significant content change (e.g., more than half of the content of a web page is unintentionally deleted), etc. Meanwhile, exemplary general adverse performance conditions can comprise (i) a meta tag no follow, (ii) an HTTP tag no follow (i.e., an X-Robots tag), etc.

Notably, although the adverse performance condition(s) are described as comprising two levels of adverse performance condition(s) (e.g., general and fatal), in other embodiments, less or more levels of adverse performance condition(s) can be implemented. For example, the levels of adverse performance condition(s) can be based on differing amounts of change in a search rank assigned to the web page (and/or one or more related web pages) by one or more web search engines (e.g., the web search engine identified by identification module 409).

In many embodiments, test module 410 can communicate with identification module 409 and/or web page database(s) 512 (FIG. 5) to identify the test web page(s). In some embodiments, the test web page(s) can comprise or consist of the domain web page(s). For example, in various embodiments, when identification module 409 does not identify significant web page(s) and priority web page(s), the test web page(s) can comprise or consist of the domain web page(s). Further, in other embodiments, the test web page(s) can comprise or consist of the significant web page(s). For example, in various embodiments, when identification module 409 does not identify priority web page(s), the test web page(s) can comprise or consist of the significant web page(s). Further still, in many embodiments, the test web page(s) can comprise or consist of the priority web page(s).

Further, in some embodiments, when the test web page(s) comprise or consist of the domain web page(s), test module 410 can identify the significant web page(s) and/or the priority web page(s) but can analyze the domain web page(s), the significant web page(s), and/or the priority web page(s) differently from each other, as applicable. For example, in these or other embodiments, the significant web page(s) can be analyzed more frequently than the domain web page(s), and/or the priority domain web page(s) can be analyzed more frequently than the domain web page(s) and the significant web page(s). Likewise, in some embodiments, when the test web page(s) comprise or consist of the significant web page(s), test module 410 can identify the priority web page(s) but can analyze the significant web page(s) and the priority web page(s) differently from each other. For example, in these or other embodiments, the priority web page(s) can be analyzed more frequently than the significant web page(s).

In some embodiments, the user of system 300 (FIG. 3) can select whether test module 410 identifies the domain web page(s), the significant web page(s), or the priority web page(s) as the test web page(s). In other embodiments, identification module 410 can determine which of the domain web page(s), the significant web page(s), or the priority web page(s) are identified as the test web page(s) by prioritizing them in reverse order of their availability (i.e., priority then significant then domain).

While in some embodiments analyzing the domain web page(s) may be desirable, in many embodiments, it may be advantageous to analyze only the significant web page(s), and further advantageous to analyze only the priority web page(s). For example, there may be too many domain web page(s) and too little computational resources to analyze all of the domain web page(s) regularly or as frequently as desired. Meanwhile, the significant web page(s) may be more valuable than others of the domain web page(s), such as, for example, as a result of their association with the keyword(s). Meanwhile, the priority web page(s) may be more valuable than others of the significant web page(s), such as, for example, as a result of their association with the higher value keyword(s). Accordingly, it can be advantageous to focus available computational resource(s) on analyzing the significant and/or priority web page(s) to ensure a user's more valuable web page(s) are not experiencing adverse performance conditions, which is explained in greater detail below. Also, by reducing the number of web page(s) that need to be analyzed, the significant and/or priority web page(s) can be analyzed more frequently than would be possible if analyzing the domain web page(s) generally. Further still, by reducing the number of web page(s) that need to be analyzed by focusing on the significant and/or priority web page(s), a cost to the user of using system 300 (FIG. 3) can be reduced, such as, for example, where a cost to the user of crawling web pages is charged by the number of web pages crawled.

In many embodiments, test module 410 can analyze the test web page(s) at one or more cyclical intervals. For example, test module 410 can analyze the test web page(s) at a regular interval (e.g., hourly, daily, weekly, etc.). In these or other embodiments, all of the test web page(s) can be analyzed at least once during an interval. In some embodiments, the user can provide the interval to test module 410. For example, test module 410 can receive the interval from the user (e.g., from user computer device 304 (FIG. 3) of the user) via communication module 408, as described above.

In these or other embodiments, test module 410 can identify a quantity of the test web page(s) to determine how many test web page(s) need to be analyzed within a particular interval. Further, when test module 410 analyzes the test web page(s), test module 410 can label the test web page(s) with one or more dates and/or times within the interval to ensure the test web page(s) are checked within the interval. Then, in a subsequent interval, test module 410 can analyze the test web page(s) again based on an order of their labeled dates and/or times. For example, test module 410 can analyze the test web page(s) in order of oldest dates and/or times to newest dates and/or times within the last interval.

In many embodiments, test module 410 can analyze the test web page(s) by crawling the test web page(s) to detect adverse performance condition(s) of the test web page(s). In some embodiments, test module 410 can crawl each of the test web page(s) systematically in a predetermined order. In other embodiments, test module 410 can identify (e.g., define or sample) two or more test web page groups of the test web page(s) and crawl the test web page groups at different times. By separating the test web page(s) into the test web page groups, crawling peaks of the user's website can be avoided. When test module defines the test web page groups, test module 410 can divide the test web page(s) into discrete (e.g., non-overlapping) test web page groups and crawl the test web page groups systematically in order. Meanwhile, when test module samples the test web page groups, test module 410 can crawl groups of the test web page(s) at random. In these embodiments, the test web page groups can overlap such that certain test web page(s) can be crawled multiple times in a particular interval. However, regardless of whether the test web page groups are defined or sampled, in many embodiments, all of the test web page(s) are analyzed at least once per interval. In many embodiments, the number of test web page(s) included in each of the test web page groups can be optimally selected to ensure that all of the test web page(s) are analyzed at least once per interval. Further, regardless of whether the test web page groups are defined or sampled, in some embodiments, the test web page(s) of a particular test web page group can be sampled systematically in order or randomly.

In some embodiments, test module 410 can communicate with condition history database(s) 513 (FIG. 5) via communication module 408 to store the adverse performance condition(s) detected by test module 410 and in some embodiments, information about the adverse performance condition (s) detected by test module 410. Storing detected adverse performance condition(s) and/or information about the detected adverse performance condition(s) at condition history database(s) 513 (FIG. 5) can make it possible to review the adverse performance condition(s) at a later time, to monitor changes in the test web page(s), and/or to determine when adverse performance condition(s) were first detected. For example, in some embodiments, upon detecting adverse performance condition(s) of a test web page of the test web page(s), test module 410 can reference condition history database(s) 513 (FIG. 5) to determine if one or more of the adverse performance condition(s) detected are newly detected or were previously detected. Accordingly, in many embodiments, test module 410 also can store when the adverse performance condition(s) were detected and/or whether the adverse performance condition(s) were newly detected.

Further, in some embodiments, test module 410 can identify a location of one or more of the adverse performance condition(s) at a test web page and/or a cause of the one or more of the adverse performance condition(s). In these embodiments, test module 410 can further store a content and/or word count of the test web page(s) at condition history database(s) 513 (FIG. 5) and compare a current content and/or word count of a test web page against a former content and/or word count of the test web page. Test module 410 can use the comparison of the current and former content and/or word count to identify changes in the content that caused one or more of the adverse performance condition(s) to arise.

In these or other embodiments, the user can communicate with condition history database(s) 513 (FIG. 5) via communication module 408 to review the adverse performance condition(s) impacting the web page(s) of the user's website and/or to review the information about the adverse performance condition(s) (e.g., when an adverse performance condition was detected, a location of an adverse performance condition at a test web page, a cause of an adverse performance condition, etc.). In these or other embodiments, the user can review the detected adverse performance condition(s), the information about the detected adverse performance condition(s), and/or information about the test web page(s) (e.g., an estimated traffic value, an estimated revenue value, etc.) at a graphical user interface generated by test module 410. The graphical user interface can also indicate one or more consequences of failing to address the adverse performance condition(s) for a particular test web page and/or for all test web page(s), which can be determined by test module 410. For example, the consequence(s) can be expressed in the form of estimated losses in traffic and/or estimated losses in revenue. Test module 410 can communicate the graphical user interface to the user (e.g., to user computer system 304 (FIG. 3) of the user) and/or the one or more third parties (e.g., one or more third party computer systems of the one or more third parties) via communication module 408, as described above. For example, in these embodiments, the graphical user interface can be displayed to the user at user computer system 304 (FIG. 3) of the user and/or at the one or more third party computer systems of the one or more third parties.

Notification Module 411

Notification module 411 can be operable to notify a user and/or one or more third parties of system 300 (FIG. 3) that one or more of the adverse performance condition(s) has been detected by test module 410. In implementation, notification module 411 can communicate notifications of detected adverse performance condition(s) to the user (e.g., to user computer system 304 of the user) and/or to the one or more third parties (e.g., to one or more third party computer systems of the one or more third parties) via communication module 408, as described above. In these or other embodiments, notification module 411 communicate notifications of detected adverse performance condition(s)

to the user (e.g., to user computer system 304 of the user) and/or to the one or more third parties (e.g., to one or more third party computer systems of the one or more third parties) using any suitable media of communication (e.g., direct mail, electronic mail, text messaging, video messaging, voice messaging, etc.). In some embodiments, the notifications can instruct the user and/or one or more of the third parties to review the graphical user interface generated by test module 410. In these or other embodiments, the notifications can include the detected adverse performance condition(s), the web page(s) affected by the detected adverse performance condition(s), information about the detected adverse performance condition(s) (e.g., when the adverse performance condition(s) were detected, location(s) of the adverse performance condition(s) at a test web page, cause(s) of the adverse performance condition(s), etc.), information about the affected test web page(s) (e.g., estimated traffic value(s) of the test web page(s), estimated revenue value(s) of the test web page(s), etc.), and/or one or more consequences of failing to address the adverse performance condition(s) (e.g., estimated losses in traffic, estimated losses in revenue, etc.).

In some embodiments, notification module 411 can notify the user and/or one or more third parties of system 300 (FIG. 3) when any adverse performance condition(s) are detected. In other embodiments, notification module 411 can notify the user and/or one or more third parties of system 300 (FIG. 3) when any adverse performance condition(s) are newly detected (e.g., only when adverse performance condition(s) are newly detected). In these or other embodiments, notification module 411 can provide one or more reminders to the user and/or one or more third parties of system 300 (FIG. 3) when any adverse performance condition(s) are detected that were previously detected.

In many embodiments, notification module 411 can provide notifications to the user and/or one or more third parties of system 300 (FIG. 3) of a same or different type and/or in a same or different manner depending on the details of the adverse performance condition(s) detected. For example, in some embodiments, notification module 411 can provide more detail in a notification for a newly detected adverse performance condition than in a reminder notification. Further, in some embodiments, when test module 410 analyzes the domain web page(s), the significant web page(s) and/or the priority web page(s) differently from each other or analyzes the significant web page(s) and the priority web page(s) differently from each other as described above with respect to test module 410, notification module 411 can provide different notifications to the user and/or one or more third parties of system 300 (FIG. 3) depending on whether the test web page comprises a domain web page, a significant web page, or a priority web page. For example, notifications for test web page(s) comprising priority web page(s) may provide more detail or be sent more frequently than notification for test web page(s) comprising significant web page(s) or domain web page(s). A similar relationship can apply between test web page(s) comprising significant web page(s) compared to test web page(s) comprising domain web page(s).

In some embodiments, the user can select (e.g., customize) how notification module 411 notifies the user and/or the one or more third parties of system 300 (FIG. 3). In many embodiments, notification module 411 can communicate with test module 410 and/or condition history database(s) 514 (FIG. 5) via communication module 408 in order to provide the notification(s) to the user and/or the one or more third parties of system 300 (FIG. 3).

Turning ahead in the drawings, FIG. 6 illustrates a flow chart for a method 600, according to an embodiment. In some embodiments, method 600 can comprise a method of monitoring one or more networked electronic resources (e.g., one or more web pages) for one or more adverse performance conditions. In some embodiments, part or all of method 600 can be performed by a system. The system can be similar or identical to system 300 (FIG. 3).

Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, central computer system 301 (FIG. 3) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. The processing module(s) can be similar or identical to the processing module(s) described above with respect to computer system 100 (FIG. 1) and/or to processing module(s) 405 (FIG. 4). Further, the non-transitory memory storage module(s) can be similar or identical to the non-transitory memory storage module(s) described above with respect to computer system 100 (FIG. 1) and/or to non-transitory memory storage module(s) 407 (FIG. 4).

In many embodiments, method 600 can comprise activity 601 of identifying a website domain name. The website domain name can be similar or identical to the website domain name described above with respect to system 300 (FIG. 3). Further, performing activity 601 can be similar or identical to identifying a website domain name as described above with respect to system 300 (FIG. 3). For example, in some embodiments, activity 601 can comprise an activity of receiving the website domain name from a user. In these or other embodiments, the user can be similar or identical to the user described above with respect to system 300 (FIG. 3). In various embodiments, activity 601 can be performed before activity 602.

In many embodiments, method 600 can comprise activity 602 of identifying one or more domain web pages. The domain web page(s) can be similar or identical to the domain web page(s) described above with respect to system 300 (FIG. 3). Further, performing activity 602 can be similar or identical to identifying one or more domain web pages as described above with respect to system 300 (FIG. 3). For example, in some embodiments, activity 602 can comprise an activity of identifying the domain web page(s) by determining all web pages associated with the website domain name.

In many embodiments, method 600 can comprise activity 603 of identifying a web search engine. The web search engine can be similar or identical to the web search engine described above with respect to system 300 (FIG. 3). Further, performing activity 603 can be similar or identical to identifying a web search engine as described above with respect to system 300 (FIG. 3). For example, in some embodiments, activity 603 can comprise an activity of receiving the web search engine from the user.

Figure 7:
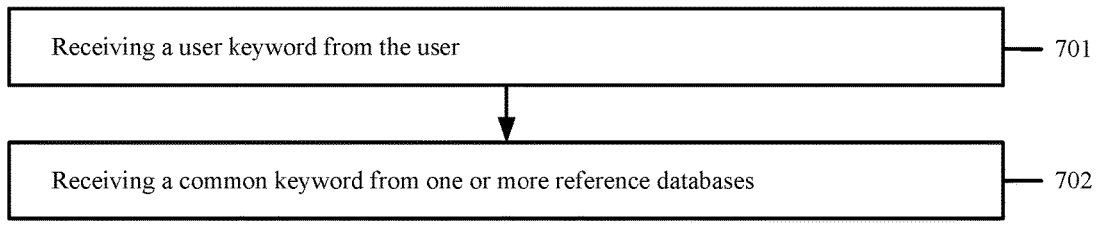
FIG. 7 illustrates an exemplary activity of identifying one or more keywords, according to the embodiment of FIG. 6.

Referring back to FIG. 6, in many embodiments, method 600 can comprise activity 604 of identifying one or more keywords. FIG. 7 illustrates an exemplary activity 604, according to the embodiment of FIG. 6.

For example, in some embodiments, activity 604 can comprise activity 701 of receiving a user keyword from the user. The user keyword can be similar or identical to one of the user keyword(s) described above with respect to system 300 (FIG. 3). Further, performing activity 604 can be similar or identical to receiving a user keyword from the user as described above with respect to system 300 (FIG. 3).

In these or other embodiments, activity 604 can comprise activity 702 of receiving a common keyword from one or more reference databases. The common keyword can be similar or identical to the common keyword described above with respect to system 300 (FIG. 3), and/or the reference database(s) can be similar or identical to the reference database(s) described above with respect to system 300 (FIG. 3). Further, performing activity 702 can be similar or identical to receiving a common keyword from one or more reference databases as described above with respect to system 300 (FIG. 3).

Referring back to FIG. 6, in many embodiments, method 600 can comprise activity 605 of identifying a search location. The search location can be similar or identical to the search location described above with respect to one or more portions of system 300 (FIG. 3). In some embodiments, performing activity 605 can be similar or identical to identifying a search location as described above with respect to system 300 (FIG. 3). In many embodiments, activity 605 can be performed as part of activity 603. In various embodiments, one or more of activities 603-605 can be performed before activity 606. In further embodiments, activities 603-605 can be performed in any suitable order.

In many embodiments, method 600 can comprise activity 606 of identifying one or more significant web pages. The significant web page(s) can be similar or identical to the significant web page(s) described above with respect to system 300 (FIG. 3). Further, performing activity 606 can be similar or identical to identifying one or more significant web pages as described above with respect to system 300 (FIG. 3). For example in some embodiments, performing activity 606 can comprise an activity of identifying the significant web page(s) by determining one or more (e.g., all) domain web pages associated with the keyword(s) by the web search engine. In some embodiments, activity 606 can be omitted.

Figure 8:
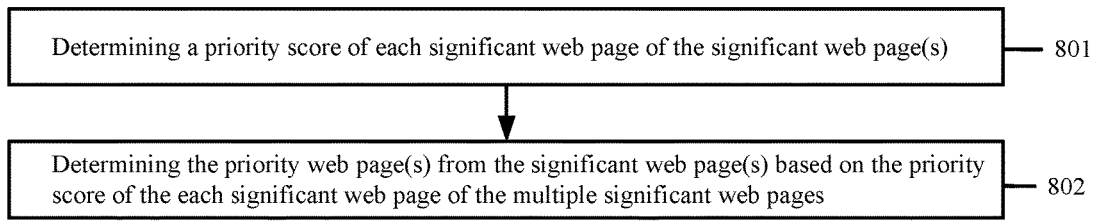
FIG. 8 illustrates an exemplary activity of identifying one or more priority web pages, according to the embodiment of FIG. 6.

In many embodiments, method 600 can comprise activity 607 of identifying one or more priority web pages. The priority web page(s) can be similar or identical to the priority web page(s) described above with respect to system 300 (FIG. 3). Further, performing activity 607 can be similar or identical to identifying the priority web page(s) as described above with respect to system 300 (FIG. 3). In some embodiments, activity 607 can be omitted. FIG. 8 illustrates an exemplary activity 607, according to the embodiment of FIG. 6.

For example, in some embodiments, activity 606 can comprise activity 801 of determining a priority score of each significant web page of the significant web page(s). The priority score can be similar or identical to the priority score described above with respect to system 300 (FIG. 3). Further, performing activity 606 can be similar or identical to determining a priority score of each significant web page of the significant web page(s) as described above with respect to system 300 (FIG. 3). For example, in some embodiments, activity 801 can comprise an activity of determining the priority score of the each significant web page of the multiple significant web pages using one or more keyword estimated traffic indexes and one or more keyword cost per click indexes.

In these embodiments, the keyword estimated traffic index(es) can be similar or identical to the keyword estimated traffic index(es) described above with respect to system 300 (FIG. 3), and/or the keyword cost per click index(es) can be similar or identical to the keyword cost per click index(es) described above with respect to system 300 (FIG. 3). Further, performing activity 801 can be similar or identical to determining the priority score of the each significant web page of the multiple significant web pages using one or more keyword estimated traffic indexes and one or more keyword cost per click indexes as described above with respect to system 300 (FIG. 3).

In many embodiments, activity 606 can comprise activity 802 of determining the priority web page(s) from the significant web page(s) based on the priority score of the each significant web page of the multiple significant web pages. In these embodiments, performing activity 802 can be similar or identical to determining the priority web page(s) from the significant web page(s) based on the priority score of the each significant web page of the multiple significant web pages as described above with respect to system 300 (FIG. 3)

Referring back to FIG. 6, in many embodiments, method 600 can comprise activity 608 of identifying one or more test web pages. The test web page(s) can be similar or identical to the test web page(s) described above with respect to system 300 (FIG. 3). Further, performing activity 608 can be similar or identical to identifying the test web page(s) described above with respect to system 300 (FIG. 3). In various embodiments, activity 608 can be performed after one or more of activities 601-607. Further, in various embodiments, one or more of activities 602-608 can be repeated one or more times. For example, in some embodiments, one or more of activities 602-608 can be repeated cyclically at an interval. The interval can be similar or identical to the interval described above with respect to system 300 (FIG. 3).

Figure 9:
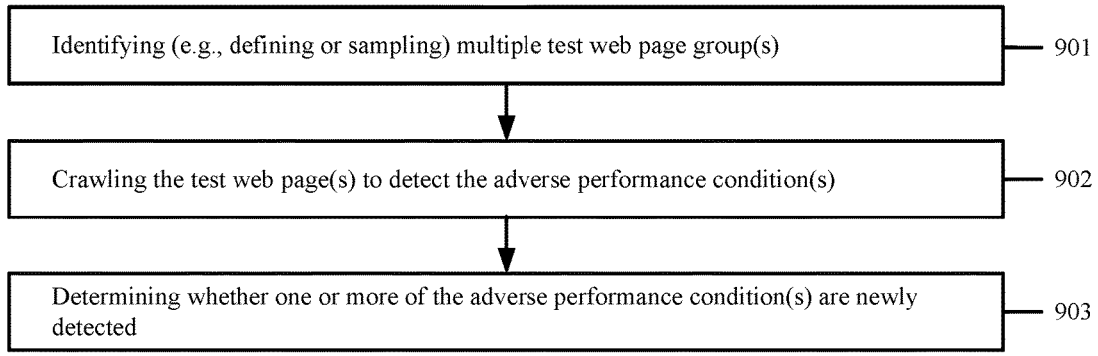
FIG. 9 illustrates an exemplary activity of analyzing one or more test web pages, according to the embodiment of FIG. 6.

In many embodiments, method 600 can comprise activity 609 of analyzing the test web page(s), such as, for example, to detect one or more adverse performance conditions. The adverse performance condition(s) can be similar or identical to the adverse performance condition(s) described above with respect to system 300 (FIG. 3). Further, performing activity 609 can be similar or identical to analyzing the test web page(s) as described above with respect to system 300 (FIG. 3).n In various embodiments, activity 609 can be performed after activity 608. FIG. 9 illustrates an exemplary activity 609, according to the embodiment of FIG. 6.

For example, in some embodiments, activity 609 can comprise activity 901 of identifying (e.g., defining or sampling) multiple test web page group(s). The test web page group(s) can be similar or identical to the test web page group(s) described above with respect to system 300 (FIG. 3). Further, performing activity 901 can be similar or identical to identifying multiple test web page group(s) as described above with respect to system 300 (FIG. 3). In some embodiments, activity 901 can be omitted.

In many embodiments, activity 609 can comprise activity 902 of crawling the test web page(s) to detect the adverse performance condition(s). In these embodiments, performing activity 902 can be similar or identical to crawling the test web page(s) to detect the adverse performance condition (s) as described above with respect to system 300 (FIG. 3). In many embodiments, activity 902 can be performed after activity 901.

In many embodiments, activity 609 can comprise activity 903 of determining whether one or more of the adverse performance condition(s) are newly detected. In these embodiments, performing activity 609 can be similar or identical to determining whether one or more of the adverse performance condition(s) are newly detected as described above with respect to system 300 (FIG. 3). In many embodiments, activity 903 can be performed after activity 901 and/or activity 902. In other embodiments, activity 903 can be omitted.

In various embodiments, one or more of activity 609, activity 901, activity 902, and/or activity 903 can be repeated one or more times. For example, in some embodiments, one or more of activity 609, activity 901, activity 902, and/or activity 903 can be repeated cyclically at an interval. The interval can be similar or identical to the interval described above with respect to system 300 (FIG. 3).

Referring back to FIG. 6, method 600 can comprise activity 610 of displaying a graphical user interface showing at least one of the adverse performance condition(s) of the test web page(s), information about the adverse performance condition(s), information about the test web page(s), and/or one or more consequences of failing to address (e.g., failing to fix) the one or more adverse performance condition(s). The information about the adverse performance condition(s) can be similar or identical to the information about the adverse performance condition(s) described above with respect to system 300 (FIG. 3); the information about the test web page(s) can be similar or identical to the information about the test web page(s) described above with respect to system 300 (FIG. 3); and/or the consequences of failing to address the adverse performance condition(s) can be similar or identical to the consequences of failing to address the adverse performance condition(s) described above with respect to system 300 (FIG. 3). Further, performing activity 610 can be similar or identical to displaying a graphical user interface showing at least one of the adverse performance condition(s) of the test web page(s), information about the adverse performance condition(s), information about the test web page(s), and/or one or more consequences of failing to address the one or more adverse performance condition(s) as described above with respect to system 300 (FIG. 3).

In many embodiments, method 600 can comprise activity 611 of notifying a user of one or more of the adverse performance condition(s). In many embodiments, performing activity 611 can be similar or identical to notifying a user of one or more of the adverse performance condition(s) as described above with respect to system 300 (FIG. 3). For example, in some embodiments, activity 611 can comprise an activity of notifying the user of the consequence(s) of failing to address the adverse performance condition(s).

Having provided the above description of system 300 (FIG. 3) and method 600 (FIG. 6), other embodiments of systems and methods are also provided herein. Some embodiments can include systems similar to system 300 (FIG. 3) and/or methods similar to method 600 (FIG. 6). Some of these systems and methods can be centric to a user computer system and/or a user (e.g., operating the user computer system). The user computer system can be similar or identical to user computer system 304 (FIG. 3) and/or the user can be similar or identical to the user described above with respect to system 300 (FIG. 3).

In many embodiments, the system and methods provided herein can be implemented for search engine optimization and/or computer networking In further embodiments, the system and methods provided herein can provide improved search engine optimization and/or computer networking by monitoring one or more networked electronic resources (e.g., one or more web pages) for one or more adverse performance conditions.

Although extending an existing product taxonomy has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the activities of method 600 (FIG. 6) or one or more of the other methods described herein may include different activities, may be performed by many different modules, and/or may be performed in many different orders. As another example, the modules within central computer system 301 and/or user computer system(s) 303 in FIG. 3 can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory memory storage devices storing computer instructions configured to run on the one or more processors and perform:
identifying a website domain name;
identifying a web search engine;
identifying one or more keywords;
identifying multiple domain web pages associated with the website domain name;
identifying multiple significant web pages of the multiple domain web pages, wherein identifying the multiple significant web pages of the multiple domain web pages comprises determining, by a web search engine crawler, domain web pages of the multiple domain web pages that are associated by the web search engine with at least one keyword of the one or more keywords, and assigning the domain web pages of the multiple domain web pages that are associated by the web search engine with the at least one keyword of the one or more keywords as the multiple significant web pages of the multiple domain web pages;
identifying multiple priority web pages of the multiple significant web pages;
identifying multiple test web pages of the multiple priority web pages;
grouping first test web pages of the multiple test web pages into a first test web page group;
grouping second test web pages of the multiple test web pages into a second test web page group, wherein the second test web page group is different than the first test web page group; and
analyzing, at different times, the first test web pages of the first test web page group and the second test web pages of the second test web page group to detect a first adverse performance condition of a test web page of at least one of the first test web pages or the second test web pages, wherein analyzing, at the different times, the first test web pages of the first test web page group and the second test web pages of the second test web page group to detect the first adverse performance condition of the test web page of the at least one of the first test web pages or the second test web pages comprises crawling, at the different times, the first test web pages of the first test web page group and the second test web pages of the second test web page group to detect the first adverse performance condition of the test web page of the at least one of the first test web pages or the second test web pages, and wherein the first adverse performance condition, when present, causes the web search engine to reduce a search rank assigned to the test web page of the at least one of the first test web pages or the second test web pages.

2. The system of claim 1 wherein:
crawling, at the different times, the first test web pages of the first test web page group and the second test web pages of the second test web page group to detect the first adverse performance condition of the test web page of the at least one of the first test web pages or the second test web pages comprises crawling, at the different times, the first test web pages of the first test web page group and the second test web pages of the second test web page group to detect a second adverse performance condition of the test web page of the at least one of the first test web pages or the second test web pages;
the first adverse performance condition comprises the second adverse performance condition; and
the second adverse performance condition, when present, causes the web search engine to delist the test web page of the at least one of the first test web pages or the second test web pages.

3. The system of claim 1 wherein:
identifying the multiple priority web pages of the multiple significant web pages comprises:
determining a priority score of each significant web page of the multiple significant web pages; and
determining the multiple priority web pages from the multiple significant web pages based on the priority score of the each significant web page of the multiple significant web pages.

4. The system of claim 3 wherein:
determining the priority score of the each significant web page of the multiple significant web pages comprises determining the priority score of the each significant web page of the multiple significant web pages using a keyword estimated traffic index and a keyword cost per click index.

5. The system of claim 1 wherein the computer instructions further are configured to perform:
causing a notification to be displayed on a display of a user computer system, wherein the user computer system is configured to display at the display of the user computer system a graphical user interface configured to list adverse performance conditions associated with the multiple test web pages, wherein the adverse performance conditions associated with the multiple test web pages comprise the first adverse performance condition of the test web page of the at least one of the first test web pages or the second test web pages, wherein the notification displays a limited list of the adverse performance conditions associated with the multiple test web pages, the limited list of the adverse performance conditions associated with the multiple test web pages comprises the first adverse performance condition of the test web page of the at least one of the first test web pages or the second test web pages, and wherein the notification is displayed on the display of the user computer system while the graphical user interface is in an un-launched state.

6. A method being implemented via execution of computer instructions configured to run at one or more processors and configured to be stored at one or more non-transitory memory storage devices, the method comprising:
identifying a website domain name;
identifying a web search engine;
identifying one or more keywords;
identifying multiple domain web pages associated with the website domain name;
identifying multiple significant web pages of the multiple domain web pages, wherein identifying the multiple significant web pages of the multiple domain web pages comprises determining, by a web search engine crawler, domain web pages of the multiple domain web pages that are associated by the web search engine with at least one keyword of the one or more keywords, and assigning the domain web pages of the multiple domain web pages that are associated by the web search engine with the at least one keyword of the one or more keywords as the multiple significant web pages of the multiple domain web pages;
identifying multiple priority web pages of the multiple significant web pages;
identifying multiple test web pages of the multiple priority web pages;
grouping first test web pages of the multiple test web pages into a first test web page group;
grouping second test web pages of the multiple test web pages into a second test web page group, wherein the second test web page group is different than the first test web page group; and
analyzing, at different times, the first test web pages of the first test web page group and the second test web pages of the second test web page group to detect a first adverse performance condition of a test web page of at least one of the first test web pages or the second test web pages, wherein analyzing, at the different times, the first test web pages of the first test web page group and the second test web pages of the second test web page group to detect the first adverse performance condition of the test web page of the at least one of the first test web pages or the second test web pages comprises crawling, at the different times, the first test web pages of the first test web page group and the second test web pages of the second test web page group to detect the first adverse performance condition of the test web page of the at least one of the first test web pages or the second test web pages, and wherein the first adverse performance condition, when present, causes the web search engine to reduce a search rank assigned to the test web page of the at least one of the first test web pages or the second test web pages.

7. The method of claim 6 wherein:
crawling, at the different times, the first test web pages of the first test web page group and the second test web pages of the second test web page group to detect the first adverse performance condition of the test web page of the at least one of the first test web pages or the second test web pages comprises crawling, at the different times, the first test web pages of the first test web page group and the second test web pages of the second test web page group to detect a second adverse performance condition of the test web page of the at least one of the first test web pages or the second test web pages;
the first adverse performance condition comprises the second adverse performance condition; and
the second adverse performance condition, when present, causes the web search engine to delist the test web page of the at least one of the first test web pages or the second test web pages.

8. The method of claim 6 wherein:
identifying the multiple priority web pages of the multiple significant web pages comprises:
determining a priority score of each significant web page of the multiple significant web pages; and
determining the multiple priority web pages from the multiple significant web pages based on the priority score of the each significant web page of the multiple significant web pages.

9. The method of claim 8 wherein:
determining the priority score of the each significant web page of the multiple significant web pages comprises determining the priority score of the each significant web page of the multiple significant web pages using a keyword estimated traffic index and a keyword cost per click index.

10. The method of claim 6 wherein:
identifying the website domain name comprises identifying the website domain name from a user.

11. The method of claim 6 wherein:
identifying the one or more keywords comprises receiving a user keyword from a user.

12. The method of claim 6 wherein:
analyzing, at the different times, the first test web pages of the first test web page group and the second test web pages of the second test web page group to detect the first adverse performance condition of the test web page of the at least one of the first test web pages or the second test web pages further comprises:
when the first adverse performance condition is detected, after crawling, at the different times, the first test web pages of the first test web page group and the second test web pages of the second test web page group to detect the first adverse performance condition of the test web page of the at least one of the first test web pages or the second test web pages, determining whether the first adverse performance condition is newly detected.

13. The method of claim 12 wherein:
analyzing, at the different times, the first test web pages of the first test web page group and the second test web pages of the second test web page group to detect the first adverse performance condition of the test web page of the at least one of the first test web pages or the second test web pages further comprises:
when the first adverse performance condition is newly detected, notifying a user of the first adverse performance condition.

14. The method of claim 13 wherein:
notifying the user of the first adverse performance condition comprises notifying the user of a consequence of the first adverse performance condition remaining present at the test web page of the at least one of the first test web pages or the second test web pages.

15. The method of claim 6 wherein:
identifying the web search engine comprises receiving the web search engine from a user.

16. The method of claim 6 wherein:
identifying the one or more keywords comprises receiving a common keyword from one or more reference databases.

17. The method of claim 6 wherein:
analyzing, at the different times, the first test web pages of the first test web page group and the second test web pages of the second test web page group to detect the first adverse performance condition of the test web page of the at least one of the first test web pages or the second test web pages further comprises:
when the first adverse performance condition is detected, notifying a user of the first adverse performance condition;
and
notifying the user of the first adverse performance condition comprises notifying the user of a consequence of the first adverse performance condition remaining present at the test web page of the at least one of the first test web pages or the second test web pages.

18. The method of claim 17 wherein:
notifying the user of the consequence of the first adverse performance condition remaining present at the test web page of the at least one of the first test web pages or the second test web pages comprises at least one of:
notifying the user of a loss in traffic resulting from the first adverse performance condition remaining present at the test web page of the at least one of the first test web pages or the second test web pages; or
notifying the user of a loss in revenue resulting from the first adverse performance condition remaining present at the test web page of the at least one of the first test web pages or the second test web pages.

19. A method being implemented via execution of computer instructions configured to run at one or more processors and configured to be stored at one or more non-transitory memory storage devices, the method comprising:
identifying a website domain name;
identifying a web search engine;
identifying one or more keywords;
identifying multiple domain web pages associated with the website domain name;
identifying multiple significant web pages of the multiple domain web pages, wherein identifying the multiple significant web pages of the multiple domain web pages comprises determining, by a web search engine crawler, domain web pages of the multiple domain web pages that are associated by the web search engine with at least one keyword of the one or more keywords, and assigning the domain web pages of the multiple domain web pages that are associated by the web search engine with the at least one keyword of the one or more keywords as the multiple significant web pages of the multiple domain web pages;

identifying multiple priority web pages of the multiple significant web pages;

identifying multiple test web pages of the multiple priority test web pages;

grouping first test web pages of the multiple test web pages into a first test web page group;

grouping second test web pages of the multiple test web pages into a second test web page group, wherein the second test web page group is different than the first test web page group;

analyzing, at different times, the first test web pages of the first test web page group and the second test web pages of the second test web page group to detect a first adverse performance condition of a test web page of at least one of the first test web pages or the second test web pages, wherein analyzing, at the different times, the first test web pages of the first test web page group and the second test web pages of the second test web page group to detect the first adverse performance condition of the test web page of the at least one of the first test web pages or the second test web pages comprises crawling, at the different times, the first test web pages of the first test web page group and the second test web pages of the second test web page group to detect the first adverse performance condition of the test web page of the at least one of the first test web pages or the second test web pages, and wherein the first adverse performance condition, when present, causes the web search engine to reduce a search rank assigned to the test web page of the at least one of the first test web pages or the second test web pages; and causing a notification to be displayed on a display of a user computer system, wherein the user computer system is configured to display at the display of the user computer system a graphical user interface configured to list adverse performance conditions associated with the multiple test web pages, wherein the adverse performance conditions associated with the multiple test web pages comprise the first adverse performance condition of the test web page of the at least one of the first test web pages or the second test web pages, wherein the notification displays a limited list of the adverse performance conditions associated with the multiple test web pages, the limited list of the adverse performance conditions associated with the multiple test web pages comprises the first adverse performance condition of the test web page of the at least one of the first test web pages or the second test web pages, and wherein the notification is displayed on the display of the user computer system while the graphical user interface is in an un-launched state.

* * * * *